DIGITAL TO ANALOG CONVERTER

Filed Oct. 2, 1967

INVENTORS
CHARLES C. HANSON
JOSEPH P. L. HO
LAWRENCE P. SEGAR

BY Donald F Voss
ATTORNEY

United States Patent Office 3,544,994
Patented Dec. 1, 1970

3,544,994

DIGITAL TO ANALOG CONVERTER

Charles C. Hanson, Rochester, Joseph P. L. Ho, Byron, and Lawrence P. Segar, Rochester, Minn., assignors to International Business Machines Corporation, Armonk, N.Y., a corporation of New York Filed Oct. 2, 1967, Ser. No. 672,268
Int. Cl. H03k 13/04, 17/16, 17/60
U.S. Cl. 340—347 7 Claims

ABSTRACT OF THE DISCLOSURE

A shunt-type digital to analog converter is provided which includes a pair of inverted transistor switches for each stage of weighting resistors to provide low voltage offset and minimum switch resistance. Dummy load resistors are connected in the circuit to maintain a constant load current when the switches are turned off. Keeping the current from the power supply relatively constant eases the load regulation requirement. This enables zener diodes to be used for regulation. Voltage across the zener reference diode will be constant at a given current.

BACKGROUND OF THE INVENTION

Field of the invention

This invention relates to digital to analog converters and more particularly to a shunt-type digital to analog converter.

Digital to analog converters find application in such machines as an optical character reader utilizing a flying spot scanner. In this type of machine, the deflection voltages for the flying spot scanner are analog voltages. However, for beam positioning, it is highly desirable to utilize computer control. The computer provides digital signals specifying the coordinate positions for the desired beam position. These digital signals are converted to analog deflection voltages.

It is desirable to have a digital to analog converter which has a high degree of accuracy so as to accurately position the beam with respect to the document being scanned. Also, high speed operation is another requirement. Of course, it is most desirable to achieve these requirements with a low cost digital to analog converter.

Description of the prior art

Prior art electronic digital to analog converters having high accuracy and high speed of operation have required relatively expensive switches. Mechanical switches cannot be used because they can be operated only at relatively low speeds. However, it is recognized that they do provide a high degree of accuracy. Generally, electronic switches are operable at very high speeds; however, generally they introduce inaccuracies due to inherent characteristics.

The principal errors in a digital to analog converter when using electronic switches are due to open circuit leakage current of the switch when the switch is in the OFF position, and the voltage offset (V*ec*) and saturation resistance (R*ec*) of the switch in the ON position. The switch resistance error is considerably larger than the other two errors. In the present invention, the electronic switch is configured so as to considerably reduce the switch resistance error.

SUMMARY OF THE INVENTION

The principal object of the invention is to provide an improved digital to analog converter which:

(a) has a high degree of accuracy,
(b) is capable of operating at relatively high speed,
(c) is relatively inexpensive, and
(d) includes compensating loads for maintaining a constant load on the power supply to reduce load degulation requirements.

DETAILED DESCRIPTION

The invention is illustrated by way of example as a digital to analog converter having four parallel binary weighted resistance summing paths. Obviously, the number of parallel resistance summing paths is a matter of choice, depending upon the accuracy desired. In fact, when the number of paths is increased beyond four, then the currents through the additional parallel paths do not require a dual transistor switch which will be described shortly.

Amplifier 10 is a conventional operational amplifier with one input connected to ground potential and with the out-of-phase input connected to a +9 volt supply through the parallel summing resistance network, and to a −9 volt supply through resistor RO. Resistor RF is the feed back resistor. Resistor RO permits a symmetrical voltage output range centered about zero volts.

Input terminal 11 is connected to the +9 volt power supply which utilizes zener diodes, not shown, as voltage references. Input terminal 11 is commonly connected to each parallel binary weighted summing resistance path. Current flowing through each parallel resistance path is controlled by a pair of transistors. The voltage at terminal 11 can then be applied to amplifier 10 through any of the parallel summing resistance paths under control of the switches.

Figure 1:
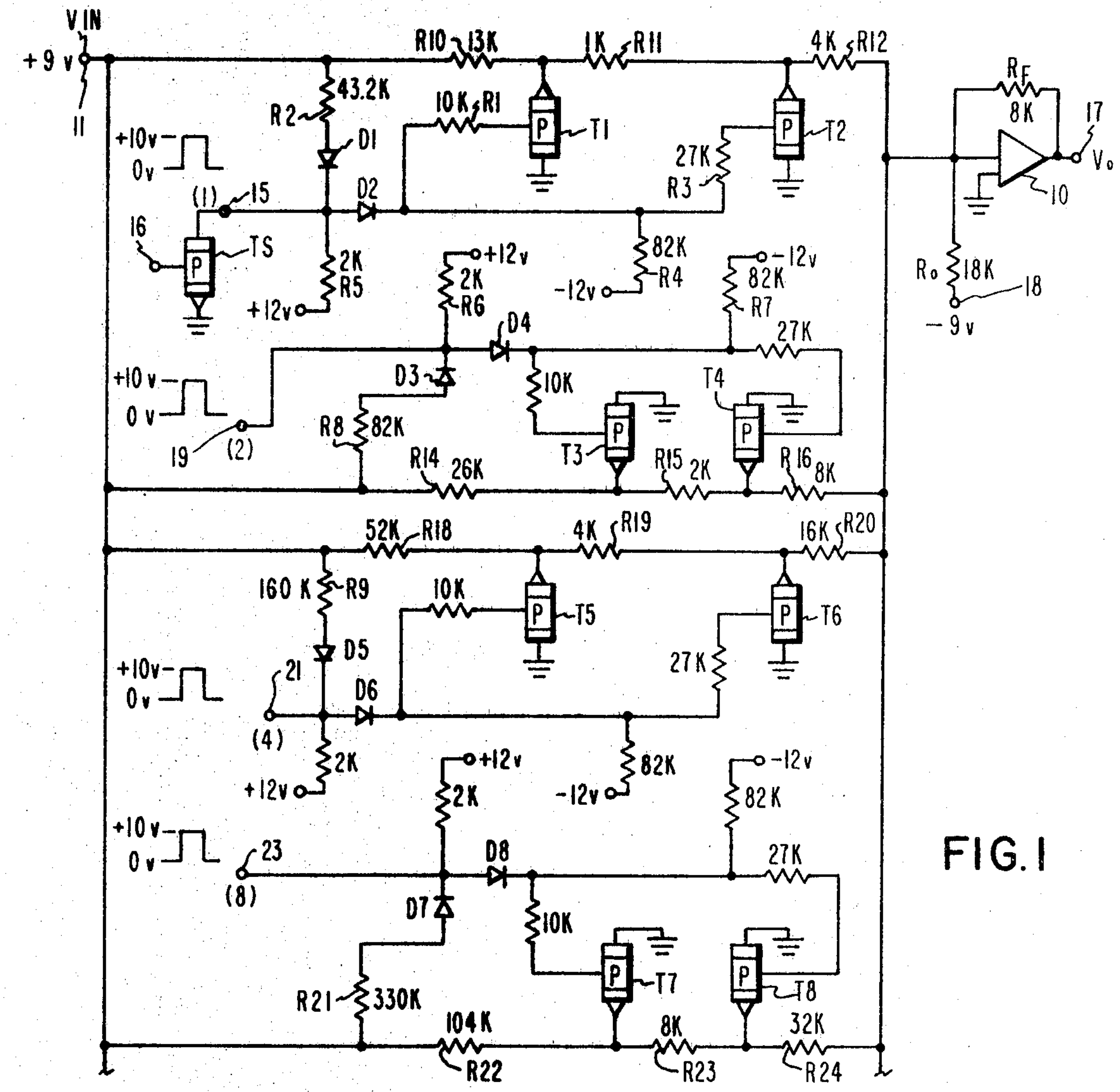
FIG. 1 is a schematic circuit diagram illustrating a preferred embodiment of the invention and FIG. 2 is a diagram showing V*ec* and R*ec* I*b*.
Figure 2:
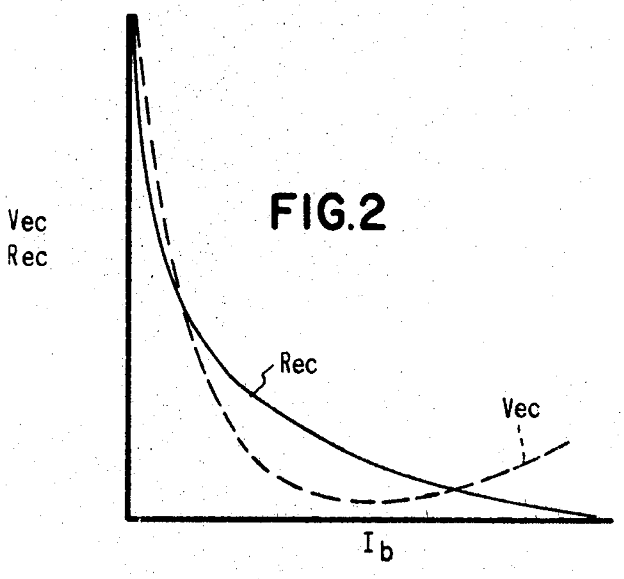

The summing resistance path corresponding to the highest order of significance consists of resistors R10, R11 and R12 which are connectable to ground potential through inverted transistor switches T1 and T2. Transistors T1 and T2 are connected in an inverted switch configuration to provide low voltage offset and minimum switch resistance. Further, the double inverted switch arrangement permits optimization of V*ec* and R*ec*. When transistors T1 and T2 are conducting, most of the current from the power supply will flow through transistor T1 and T1 is optimized with respect to R*ec*. By having a smaller amount of current flow through transistor T2, it is optimized with respect to V*ec*. Hence, both V*ec* and R*ec* errors are reduced. This could not be done with a single switch because if you tend to operate with a small V*ec* error, then, as seen in FIG. 2, the R*ec* error is great and vice versa.

Transistors T1 and T2 are switched on and off by a logic pulse applied to terminal 15. The voltage at terminal 15 can be controlled by transistor switch TS which has an input terminal 16 connected to its base. The emitter of TS is connected to ground and its collector is connected to terminal 15. By this arrangement, the voltage level at terminal 15 is controlled at either ground potential or +10 volts. When the potential at terminal 15 is at zero volts or ground potential, both diodes D1 and D2 are forward biased and resistors R1, R3 and R4 insure that the bases of transistor T1 and T2 are reversed biased. Most of the current flows through dummy load resistor R2 to maintain a constant load on the positive power supply. With transistors T1 and T2 off, current is supplied via resistors R10, R11 and R12 to the out-of-phase input of amplifier 10. This causes the voltage at the output terminal 17 to go negative.

When transistor switch TS is off, terminal 15 is at approximately 10 volts. Diode D1 is reverse biased and dummy load resistor R2 will not have any current flowing through it. Diode D2 is still forward biased and base current is provided through resistor R5 to the bases of transistors T1 and T2 via resistors R1 and R3, respectively. Resistor R1 is smaller than the resistor R3 and therefore transistor T1 is caused to conduct more current than transistor T2. Hence, transistor T1 is operated in a region where its internal resistance R*ec* is smaller and transistor T2 operates in a region where its offset voltage V*ec* is smaller.

With both transistors T1 and T2 ON, a current flowing from the positive power supply is shunted to ground. Hence, there is a decrease in the amount of input current to amplifier 10 and this causes the output voltage at terminal 17 to go positive.

Resistors R14, R15 and R16 are connected to form the second highest order of significance. Transistors T3 and T4 are connected to operate in the same manner as described with respect to transistors T1 and T2. Similarly, resistor R8 is a dummy load resistor and performs the same function as resistor R2. Diodes D3 and D4 are connected to function in the same manner as diodes D1 and D2. Terminal 19 is to be connected in the same manner as terminal 15 and is switched between ground potential and +10 volts by a switch similar to transistor TS.

Resistors R18, R19 and R20 are connected to form the next highest order of significance. Transistors T5 and T6 are operable in the same manner as transistors T1 and T2 to either shunt the current to ground or permit current from the +9 volt supply to flow through resistors R18, R19 and R20 to amplifier 10. Transistors T5 and T6 are of course controlled by the voltage level at terminal 21 which is connected to a switching transistor not shown. Resistor R9 is the dummy load resistor. Diodes D5 and D6 are connected to function in the same manner as diodes D1 and D2. The next order of significance is formed by resistors R22, R23, and R24. Current will flow through these resistors to amplifier 10 only if transistors T7 and T8, connected to function in the same manner as transistors T1 and T2, are off. Resistor R21 is the dummy load resistor and diodes D7 and D8 are connected to function in the same manner as diodes D1 and D2.

It is thus seen that if transistors T1–T8 are all ON, no current from the +9 volt supply will be furnisned to amplifier 10. However, the −9 volt supply will furnish current, and therefore, the output voltage will be at a maximum positive level which is approximately +4 volts. If all of the transistors T1–T8 are turned OFF, a maximum amount of current will be provided from the +9 volt supply to amplifier 10 and the output voltage at terminal 17 will be approximately −4 volts. The output voltage at terminal 17 will vary between + and −4 volts depending upon whether one or more parallel resistance branches is providing current to amplifier 10. For example, if transistors T1 and T2 are OFF, and transistors T3–T8 are ON, the voltage at terminal 17 will be approximately zero volts. This is because the amount of current flowing through resistors R10, R11 and R12 is substantially the same as the amount of current flowing through resistor RO and the currents being of opposite polarity tend to cancel each other at the out-of-phase input of amplifier 10. When the next order of significance of the parallel resistance branches conducts current, it causes the output voltage at terminal 17 to be decreased by 2 volts. When current flows through the third order parallel resistance branch the output voltage at terminal 17 is decreased by one volt. Current flowing through the parallel resistance branch having the fourth order of significance reduces the output voltage by one-half volt. The next order of significance if there were one would reduce the output voltage by one-fourth of a volt. It is thus seen that additional orders could be added to increase the voltage division available. Of course, with only four orders, the range will vary from +4 volts to −3½ volts.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a digital to analog converter including an operational amplifier and a plurality of parallel resistance branches connected between a reference voltage and said amplifier, the improvement comprising:

a pair of current switches for at least one of said parallel resistance branches connected to shunt current from said reference voltage to ground when ON and to permit current to flow through said one of said parallel resistance branches to said amplifier when OFF, means for turning said current switches simultaneously ON and simultaneously OFF, and means for causing one switch when turn ON to conduct current at a level where the internal resistance thereof is at a minimum and the other switch when turned ON to conduct current at a level with the voltage offset thereof at a minimum.

2. The digital to analog converter of claim 1 further comprising:

a dummy load connected to at least one of said parallel resistance branches, and means operative in response to said current switches being OFF and ON to permit and prevent current to flow through said dummy load respectively.

3. The digital to analog converter of claim 2 where said means for permitting current to flow through said dummy load when said current switches are OFF is a diode

4. The digital to analog converter of claim 2 where said dummy load is a resistance.

5. The digital to analog converter of claim 1 where said current switches are transistors connected in an inverted switch configuration.

6. The digital to analog converter of claim 5 where said transistors are NPN transistors.

7. In a digital to analog converter including an operational amplifier and a plurality of parallel resistance branches connected between a reference voltage and said amplifier, the improvement comprising:

means for selectively shunting current flowing in at least one of said parallel resistance branches to ground potential including a first transistor current switch having its emitter connected to a first point of said one resistance branch and its collector connected to ground potential;

a second transistor current switch having its emitter connected to a second point of said one resistance branch and its collector connected to ground potential; and switching means connected to the bases of said first and second transistors to simultaneously turn said first and second transistors ON and to simultaneously turn said first and second transistors OFF, said switching means including means for providing more base current to said first transistor than to said second transistor.

References Cited

UNITED STATES PATENTS

| | | | |
|---|---|---|---|
| 3,239,831 | 3/1966 | Francisco | 340—347 |
| 3,325,805 | 6/1967 | Dorey | 340—347 |

OTHER REFERENCES

Millman & Taub, Pulse, Digital & Switching Waveforms, 1965, pp. 649–652.

Fitchen, Transistor Circuit Analysis and Design, 1966, pp. 374—375.

MAYNARD R WILBUR, Primary Examiner

M. K. WOLENSKY, Assistant Examiner

U.S. Cl. X.R.

307—240, 242, 254